United States Patent Office 3,271,405
Patented Sept. 6, 1966

3,271,405
ACYLHYDRAZINO BENZISOTHIAZOLES
Calvert W. Whitehead and John J. Traverso, both of Indianapolis, Ind., assignors to Eli Lilly and Company, Indianapolis, Ind., a corporation of Indiana
No Drawing. Filed Oct. 11, 1965, Ser. No. 494,892
4 Claims. (Cl. 260—301)

This invention relates to novel acylhydrazino-substituted 1,2-benzisothiazole 1,1-dioxides and to methods for their preparation.

The present compounds differ in certain structural features from benzisothiazoles revealed in the prior art. For example, 3-butylamino-1,2-benzisothiazole 1,1-dioxide is reported to possess blood sugar-lowering properties [McLamore and Loubach, Compt. rend. cong. intern. Chim. ind., 31e, Liege, 1958; Chem. Abs., 54, 5960 (1960)]. Another compound, 5-chloro-1,2-benzisothiazolin-3-one, is reported to be effective in the control of algae, bacteria, and fungi [British Patent 844,541 (December 13, 1961)], and the 1,2-benzisothiazolones taught in Belgian Patent 617,384 (November 8, 1962) possess anti-inflammatory properties. However, substituted 1,2-benzisothiazole 1,1-dioxides of the type herein disclosed and possessing the new and unexpected utilities herein described have not previously been known. These novel compounds have highly useful and unexpected properties as hypotensive agents.

A primary object of this invention is to provide novel 1,2-benzisothiazole 1,1-dioxides which differ in structure from prior-art compounds. Another object of this invention is to provide processes for the preparation of the novel compounds. These and other objects of this invention are more fully described hereinafter.

The novel 3-acylhydrazino-1,2-benzisothiazole 1,1-dioxides of this invention are represented by the following general formula:

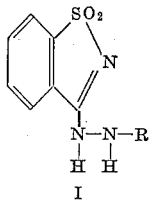

I wherein R is acetyl or propionyl.

While the compounds of the present invention have been defined in terms of a structural formula which depicts the novel structural features of the claimed compounds and which indicates the presence therein of a fused-ring structure including the benzo moiety, it will be recognized by those skilled in the art that such a moiety may bear one or more substituents without departing in any way from the spirit of the invention and without altering the properties of the novel compounds in such a way as would set them apart from the invention or take them outside its scope. Therefore, compounds having the novel structure of the present invention and bearing such substituents are to be considered as equivalents of the unsubstituted compounds and are to be considered to lie within the scope of the invention. Among such substituent atoms and radicals are halo, $C_1$-$C_3$ alkyl, trifluoromethyl, $C_1$-$C_3$ alkyloxy, and sulfamyl.

The hypotensive properties of the novel compounds of this invention can be utilized by administering the compounds in a form adapted for oral or parenteral administration, oral administration being especially preferred because of the ease and convenience associated therewith. Thus, the compositions can be in the form of a compressed tablet or a filled capsule, as well as in the form of a solution or suspension suitable for oral or intramuscular administration.

The novel compounds of this invention show interesting hypotensive activity when administered orally or i.v. to rats made hypertensive by the well-known Goldblatt method. Doses of 20–40 mg./kg. orally for 5 days cause a significant lowering of the blood pressure in the test animals. Equally significant blood pressure lowering is accomplished by administering the compounds in doses of 10–20 mg./kg. i.v., the effect on the blood pressure of the Goldblatt rats being cumulative and independent of the method of administration.

The novel compounds of this invention are conveniently prepared utilizing as one of the starting reagents 3-hydrazino-1,2-benzisothiazole 1,1-dioxide, represented by the following formula:

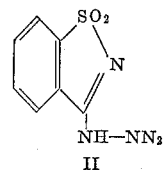

II or a substitution product thereof, as set forth above.

The compounds of Formula II are useful as intermediates and possess interesting hypotensive properties in their own right. The starting materials are readily prepared by the method outlined in the flow sheet below, wherein 1,2-benzisothiazole 1,1-dioxide (saccharin) has been used as the exemplary starting material.

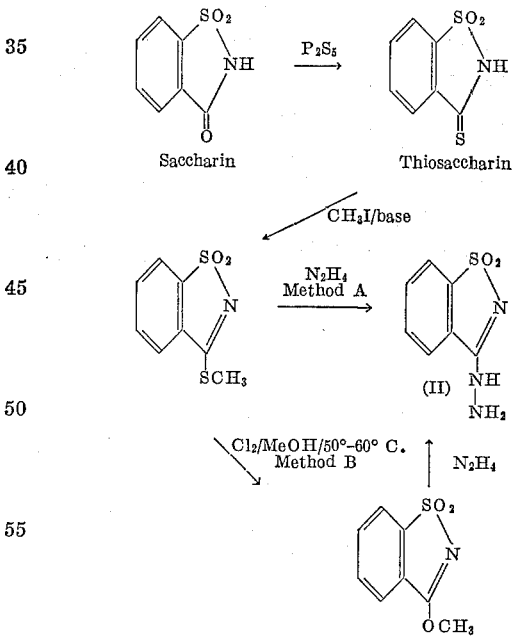

In this method, saccharin is allowed to react with $P_2S_5$ according to the teachings of Meadow and Cavagnol, J. Org. Chem., 16, 1852 (1951), to yield 3-mercapto-1,2-benzisothiazole 1,1-dioxide (thiosaccharin), which compound is methylated using a methylating agent such as methyl bromide, methyl iodide, dimethyl sulfate or the like, in the presence of base, a method well known to the art. The 3-methylmercapto-1,2-benzisothiazole 1,1-dioxide is then allowed to react with hydrazine hydrate in a suitable solvent, for example, methanol (Method A), to give 3-hydrazino-1,2-benzisothiazole 1,1-dioxide in good yield.

In an alternative method (Method B), the methylmercapto-benzisothiazole can be conveniently oxidized, suitably with chlorine gas in methanol at a temperature of around 50–60° C., to yield 3-methoxy-1,2-benzisothiazole 1,1-dioxide. The latter compound can then be readily reacted with hydrazine hydrate in methanol as a solvent to yield the desired hydrazino compound. This alternative and preferred procedure has been developed to provide starting materials of greater purity which react more cleanly.

The 3-(acylhydrazino)-1,2-benzisothiazole 1,1-dioxide compounds of this invention (Formula I, hereinabove) can be obtained by commingling an appropriate 3-hydrazino-1,2-benzisothiazole 1,1-dioxide (Formula II, above) with an acylating agent in a mutual organic solvent such as dioxane, and warming the reaction mixture to reflux temperature for a period of time sufficient to produce a substantial yield of the desired condensation product. Other solvents suitable for use in carrying out the reaction include an excess of the acylating agent, benzene, diglyme, and the like. The time of reaction may vary widely without too much effect on the yield of product obtained. A convenient period of reaction is two hours, although reaction times as long as 18 hours have been utilized, the yield remaining satisfactory even under the conditions of the longer period of heating. Suitable acylating agents include acetic anhydride, propionic anhydride, acetyl chloride, propionyl chloride, and the appropriate ketenes. The reaction product mixture is worked up by cooling and filtering off the crystalline product, then recrystallizing from dilute aqueous ethanol to yield the desired 3-(acylhydrazino)-1,2-benzisothiazole 1,1-dioxide.

That the invention may be more easily comprehended, examples of the synthesis of the compounds coming within the scope of the invention are given hereinbelow.

EXAMPLE 1

*3-(2-acetylhydrazino)-1,2-benzisothiazole 1,1-dioxide*

A mixture of 10 g. (0.05 mole) of 3-hydrazino-1,2-benzisothiazole 1,1-dioxide and 5 g. (0.05 mole) of acetic anhydride in 200 ml. of dioxane was refluxed for about 2 hours. The reaction product mixture was cooled to room temperature and the solid product filtered off. Crystallization of the solid product from dilute aqueous ethanol yielded 3-(2-acetylhydrazino)-1,2-benzisothiazole 1,1-dioxide having a melting point of about 224° C. Yield: 9 g. (75 percent of theory).

*Analysis.*—Calcd: C, 45.18; H, 3.79; N, 17.56. Found: C, 45.43; H, 3.79; N, 17.57.

Following the same procedure as in Example 1, the following compound was prepared:

3-(2-acetylhydrazino)-6-chloro-1,2-benzisothiazole 1,1-dioxide. Melting point: 274° C.

*Analysis.*—Calcd: C, 39.49; H, 2.94; N, 15.34. Found: C, 39.81; H, 3.27; N, 14.95.

EXAMPLE 2

*3-(2-propionylhydrazino)-1,2-benzisothiazole 1,1-dioxide*

A mixture of 20 g. (0.10 mole) of 3-hydrazino-1,2-benzisothiazole 1,1-dioxide and 13 g. (0.10 mole) of propionic anhydride in 400 ml. of dioxane was heated on the steam bath overnight. The reaction product mixture was concentrated in vacuo to dryness and the residue recrystallized from dilute aqueous ethanol to yield 3-(2-propionylhydrazino)-1,2-benzisothiazole 1,1-dioxide having a melting point of about 200° C. Yield: 15 g. (60 percent of theory).

*Analysis.*—Calcd: C, 47.42; H, 4.37; N, 16.59. Found: C, 47.08; H, 4.84; N, 16.55.

We claim:

1. Compounds of the formula:

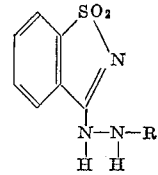

wherein R is acetyl or propionyl.

2. 3-(2-acetylhydrazino)-1,2-benzisothiazole 1,1 - dioxide.

3. 3-(2-propionylhydrazino)-1,2-benzisothiazole 1,1-dioxide.

4. 3-(2 - acetylhydrazino)-6-chloro-1,2-benzisothiazole 1,1-dioxide.

No references cited.

HENRY R. JILES, *Acting Primary Examiner.*
ALTON D. ROLLINS, *Assistant Examiner.*